United States Patent
Watkins, Jr. et al.

(10) Patent No.: US 8,668,592 B2
(45) Date of Patent: Mar. 11, 2014

(54) SYSTEMS AND METHODS OF CHANGING STORYLINE BASED ON PLAYER LOCATION

(75) Inventors: Oliver Watkins, Jr., Toronto (CA); Yousuf Chowdhary, Maple (CA); Jeffrey Brunet, Richmond Hill (CA); Ravinder ("Ray") Sharma, Richmond Hill (CA)

(73) Assignee: 2343127 Ontario Inc. (CA)

( * ) Notice: Subject to any disclaimer, the term of this patent is extended or adjusted under 35 U.S.C. 154(b) by 89 days.

(21) Appl. No.: 13/325,151

(22) Filed: Dec. 14, 2011

(65) Prior Publication Data

US 2012/0157197 A1 Jun. 21, 2012

Related U.S. Application Data

(60) Provisional application No. 61/459,630, filed on Dec. 17, 2010.

(51) Int. Cl.
*A63F 9/24* (2006.01)

(52) U.S. Cl.
USPC .......... 463/43; 463/1; 463/9; 463/40

(58) Field of Classification Search
USPC .................................. 463/40–43, 1
See application file for complete search history.

(56) References Cited

U.S. PATENT DOCUMENTS

| | | | | |
|---|---|---|---|---|
| 7,373,377 | B2 * | 5/2008 | Altieri | 709/203 |
| 7,970,749 | B2 * | 6/2011 | Uhlir et al. | 707/705 |
| 8,228,325 | B2 * | 7/2012 | Barbaro Altieri | 345/418 |
| 2006/0105838 | A1 * | 5/2006 | Mullen | 463/31 |
| 2007/0281766 | A1 * | 12/2007 | Mullen | 463/7 |
| 2008/0015018 | A1 * | 1/2008 | Mullen | 463/39 |
| 2008/0015024 | A1 * | 1/2008 | Mullen | 463/42 |
| 2008/0280684 | A1 * | 11/2008 | McBride et al. | 463/42 |
| 2008/0284777 | A1 * | 11/2008 | Altieri | 345/418 |
| 2009/0017913 | A1 * | 1/2009 | Bell et al. | 463/40 |
| 2009/0029771 | A1 * | 1/2009 | Donahue | 463/31 |
| 2009/0181774 | A1 * | 7/2009 | Ratcliff | 463/42 |
| 2011/0319148 | A1 * | 12/2011 | Kinnebrew et al. | 463/1 |

* cited by examiner

*Primary Examiner* — William Brewster
*Assistant Examiner* — Alex F. R. P. Rada, II

(57) ABSTRACT

A method is provided for enabling virtual gameplay with a character in a game environment. A game environment is provided in which a player can play a game via a character. The player's geographic location is detected and stored. In response to the detected geographic location, a storyline is retrieved for the character to interact with. The retrieved storyline is related to the geographic location of the player.

25 Claims, 5 Drawing Sheets

SYSTEMS AND METHODS OF CHANGING STORYLINE BASED ON PLAYER LOCATION

CROSS REFERENCE TO RELATED APPLICATIONS

This application claims priority from U.S. Provisional Application No. 61/459,630 filed on Dec. 17, 2010, which is incorporated by reference in its entirety herein.

FIELD OF THE INVENTION

The present invention is related to video game applications in general and video game applications with a changing storyline based on the player location in particular.

BACKGROUND OF THE INVENTION

A virtual world is a computer simulated environment. A virtual world may resemble the real world, with real world rules such as physical rules of gravity, geography, topography, and locomotion. A virtual world may also incorporate rules for social and economic interactions between virtual characters. Players (users) may be represented as avatars, two or three-dimensional graphical representations. Virtual worlds may be used for massively multiple online role-playing games, for social or business networking, or for participation in imaginary social universes.

Prior art virtual worlds have storylines that are either static or branch in a rather predictable fashion. Prior art methods for a branching storyline are well known in the industry, where the outcome of one encounter defines the starting point of the next. Such virtual worlds have a set number of possible branches and a player's skills, and interaction with other players and non-player characters (NPCs) aid in the creation of variety and new possibilities. Mostly the storyline is also dependent on the virtual character (Player Character) that a player chooses to engage in the gameplay of the virtual world.

Such virtual worlds currently lack the ability to take the player's location into account for meaningful impact on the gameplay. Taking into account the player's location in the storylines of such games would offer a richer and more unique gameplay experience for each player.

SUMMARY OF THE INVENTION

A player's real world location e.g. where the player lives or works, may have a significant meaning for the player, and thus an emotional bond may already exist. By exploiting this emotional bond and making the storyline of a virtual world dependent on the location of a player, a more interesting and meaningful experience can be provided. Thus a player may be willing to spend more time engaging with a virtual world when the virtual world's storyline is impacted by the location of the player.

This application describes systems and methods whereby the storyline of a virtual world may change based on the real world location of a player. Thus the real world location of a player can influence the gameplay of a virtual world. For example if a player is downtown (and at a specific location) then the virtual world's (game) storyline may change accordingly, and if a player is in a ghetto, the storyline changes to reflect this location, and if a player is in suburbia the storyline changes yet again to reflect this location.

There may be generic profiles for generic locations. For example, generic locations (such as downtown, mall, suburbia, ghetto, country side, beach, lake, forest, airport, train station etc.) may each have a profile. There may be virtual characters associated with each of the location profiles. One way this may impact the storyline is through choice of virtual character. In a single player virtual world, the virtual characters that are available to the player may be dependent on the player's location. In a multi-player game, the location of each player may introduce virtual characters associated with the players' real world locations. Thus depending on who is playing from where the collective storyline may keep changing, since the combination of virtual characters can change based on the real world location of the players.

The term storyline may include but is not limited to the aesthetics, virtual characters that are available, plot, set of plot nodes, settings etc. and may change individually or in combination with the location of the player.

The storyline can change, evolve, branch or morph based on the location of the player. Alternate settings may also be applied, and/or alternate levels may be offered for gameplay based on the location of the player.

Other effects may relate to the items and loot that the players may come across, the monsters and enemies that they may fight, and the traps and puzzles that they may have to overcome.

Using the methods and systems disclosed in this application the player's real world location becomes a vital factor impacting the storyline of the virtual world. This provides for a richer gaming experience and increases player engagement while making the gameplay of the virtual world more unique for each player. The systems and methods described here enable a player to have a unique and more enjoyable gaming experience.

According to a first aspect of the invention, a method is provided for enabling virtual gameplay with a character in a game environment. A game environment is provided in which a player can play a game via a character. The game environment is in communication with a storage means. The player's geographic location is detected (i.e. automatically retrieved from some device or data, or it may be supplied directly or indirectly by the player) and is then stored on the storage means. In response to the detected geographic location, a storyline is retrieved for the character to interact with. This storyline is related to the geographic location of the player.

Each storyline comprises one or a combination of plot, plot nodes, character interactions, encounters, settings, aesthetics, levels, premise, or theme.

Certain steps of the method may be repeated. A second or subsequent geographic location of the player may be detected in the course of gameplay, and a second or further storyline retrieved for the player's character to interact with (the second or further storyline being related to the second or subsequent geographic location). The second or further storyline may replace the previously retrieved storyline, or be added to the previously retrieved storyline.

Preferably, the storyline includes graphical images of a generic background scene related to the geographic location. The generic background scene may be selected from the group consisting of downtown, mall, suburbia, ghetto, countryside, farm, beach, lake, forest, desert, mountainside, airport, and train station.

Instead of a generic background scene, the storyline may include graphical images of a location-specific background scene. For example, the scene may include at least one landmark representative of the player's detected geographic location.

Other changes are possible, taking into account the player's location. For example, the detected geographic location may be correlated to demographic data for that geographic location. From this, non-player characters may be triggered to enter the game that represent the demographic data. Population density data could also be retrieved for that geographic location, and non-player characters could be triggered to enter the game that represent the population density data.

At the character level, individual character statistics of the character may be modified in response to the detected geographic location. Tools, equipment or clothing of the character may also be modified in response to the detected geographic location.

For example, if the player is playing the game from a beach location, the game may have a background depicting a sunny beach where calm waves lap the sand. Non-player characters are seen wearing bikinis, sipping sodas, and lounging on the sand. The player character may be set the task of building sand castles or digging for hidden treasure and clues buried in the sand. The accompanying audio may have soft music with the sound of waves overlaid.

Contrast this with the same game played from a train station location. The background may show a platform where trains are seen arriving and departing. Non-player characters (passengers) are seen getting on and off the trains. The player character may look for treasure hidden in the luggage or train compartments. Clues may be provided by the announcement or billboards. The accompanying audio may be the sound of arriving and departing trains and intermittent announcements.

Where the game environment is accessible by multiple players, players co-located in one geographic location may interact in the game with each other via their characters. Another possibility is that a new player joining the game from a previously-unrepresented geographic location could open up a new storyline for all of the players currently in the game. By the same token, if a player is the only player from a specific geographic location, the departure of that player from the game might then close up a storyline for the remaining players in the game. In this way, the players' diverse locations are reflected and represented as diversity in the collective game accessible to all players.

The player's geographic location may be re-detected at intervals. In the event of a change in the player's geographic location, the character may be shown moving to a new scene in the storyline.

The detecting step may include retrieving location data from one or a combination of GPS, A-GPS, WiFi, IP address, account or billing address, and player provided location information. The detecting step may further include retrieving at least one map from a map database in response to the at least one detected geographic location. The map data may be used for example to determine the street location, the nearest landmarks, nearby businesses, the terrain of the area, the demographics of the area, or to get the street view. The street view may be used for example as a background image in the game.

The geographic location may be detected at login, or during gameplay (or both). If no geographic location is detected or if the detected geographic location is an unsupported geographic location, a default storyline may be provided. Alternatively, the player may be permitted to choose from a selection of supported locations (e.g. previous locations played by that player, or locations of other players already in the game). The player may also be able to elect not to have his/her location detected, or to cease location detection.

The storage means is preferably provided by one or a combination of: a local fixed memory, a local removable memory, a remote fixed memory, a remote removable memory, and a virtual memory. For example: a local data storage of a game console, a local inbuilt memory, a user provided memory, an online server, or a shared folder on a network.

Various hardware and software implementations are possible. In one embodiment, the player may be enabled to play the game using a game device. In that case, the player's geographic location may be detected by an on-board sensor on the game device. The game device may be a mobile device (such as any type of portable electronic device—a mobile phone or smartphone, a handheld music player (e.g. iPod), a portable game device/console, a portable computer or laptop, a tablet computer, etc.).

BRIEF DESCRIPTION

DETAILED DESCRIPTION

Figure 1:
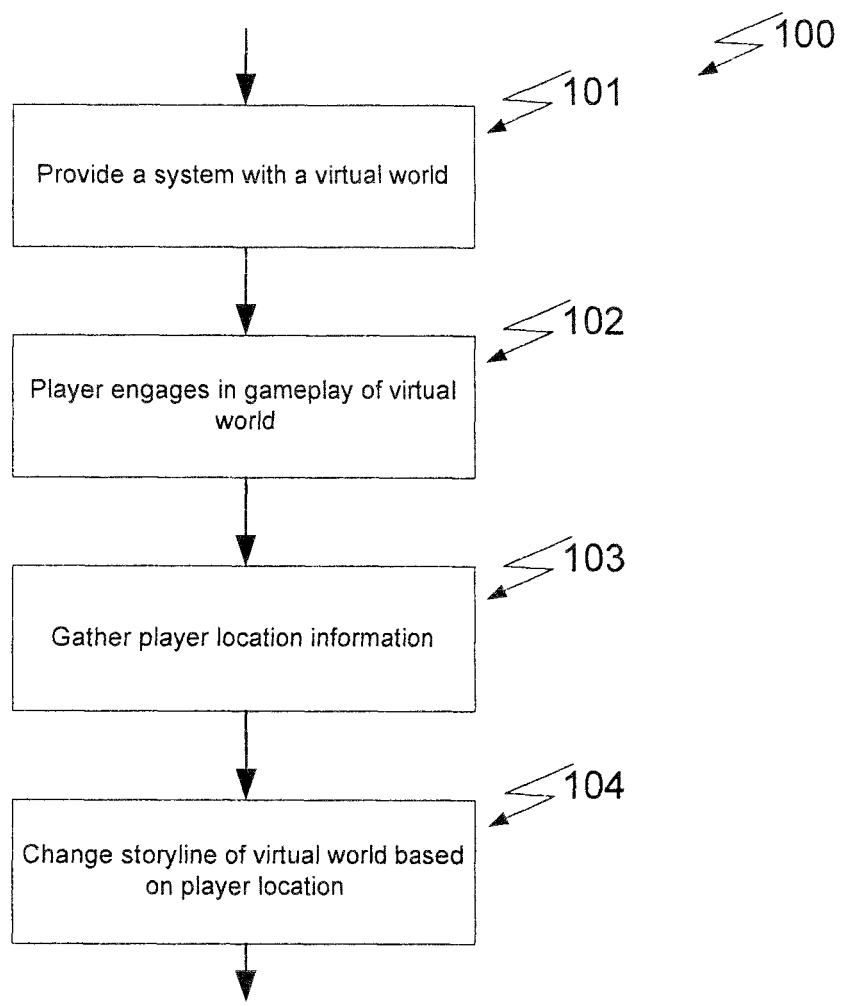
FIG. 1 is a flow diagram representing a first general concept of the invention.

Methods and arrangements of changing storyline for gaming applications and virtual worlds based on player location are disclosed in this application.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in details, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A "virtual world" as used herein need not be a "game" in the traditional sense of a competition in which a winner and/or loser is determined, but rather that the term "game" incorporates the idea of a virtual world. Moreover, a person or entity who enters the virtual world in order to conduct business, tour the virtual world, or simply interact with others or the virtual environment, with or without competing against another person or entity is still considered to be "playing a game" or engaging in the gameplay of the game.

Virtual worlds can exist on game consoles for example Microsoft Xbox, and Sony Playstation, Nintendo Wii, etc., or on online servers, or on mobile devices (e.g. an iPhone or an iPad), Smartphones, portable game consoles like the Nintendo 3DS, or on a PC (personal computer) running MS Windows, or MacOS, Linux or another operating system. This list is not exhaustive but is exemplary of devices or computing environments where virtual worlds can exist, many other variations are available and known to the ones skilled in the art.

A computer or a game console that enables a user to engage with a virtual world, including a memory for storing a control program and data, and a processor (CPU) for executing the control program and for managing the data, which includes user data resident in the memory including a set of gameplay statistics. The computer, or a game console, may be coupled to a video display such as a television, monitor, or other type of visual display while other devices may have it incorporated in them (iPad). A game or other simulations may be stored on a storage media such as a DVD, a CD, flash memory, USB memory or other type of memory media. The storage media can be inserted to the console where it is read. The console can then read program instructions stored on the storage media and present a game interface to the user.

Typically, a user or a player manipulates a game controller to generate commands to control and interact with the virtual world. The game controller may include conventional controls, for example, control input devices such as joysticks, buttons and the like. Using the controller a user can interact with the game, such as by using buttons, joysticks, and movements of the controller and the like. This interaction or command may be detected and captured in the game console. The user's inputs can be saved, along with the game data to record the game play. In one embodiment, the gameplay data can include usage statistics captured to record the user's experience as they progress from one level of the game to the next.

The term "player" is intended to describe any entity that accesses the virtual world, regardless of whether or not the player intends to or is capable of competing against other players. Typically, a player will register an account with the game console within a peer-to-peer game and may choose from a list or create virtual characters that can interact with other virtual characters of the virtual world.

The term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

A "virtual character" may include a persona created by a player or chosen from a list in the virtual world. Typically virtual characters are modeled after the humans whether living or fantasy (e.g. characters from mythology).

A virtual character can be represented by one or more gameplay statistics, which encapsulate some meaning to connect the virtual (and digital) reality of the game to the real world. Many of these statistics are not apparent to the player as such, but are instead encoded within the framework of the game or composed together to form a script. In role-playing games (RPGs) and similar games, these statistics may be explicitly exposed to the user through a special interface, often with added meaning which provides context for the user's actions.

In virtual worlds (video/computer games), a "non-player character" (NPC) is a virtual character that is controlled by the program and not a player. NPC may also refer to other entities not under the direct control of players. NPC behavior in a virtual world may be scripted and automatic.

A "player character" or "playable character" (PC) is a virtual character in a virtual world that is controlled or controllable by a player. A player character is a persona of the player who controls it. In some cases, a virtual world has only one player character and in other cases there may be a small number of player characters from which a player may pick a certain virtual character that may suit his or her style of gameplay, while in other scenarios there may be a large number of customizable player characters available from which a player may choose a virtual character of their liking. In this disclosure, generally a "virtual character" or simply "character" is intended to refer to a player character unless otherwise noted or inferable from the context.

An "avatar" relates generally to the physical embodiment of a virtual character in the virtual world.

For the purpose of this application the terms "story" or "storyline" include plot nodes, virtual character(s) (PC and NPC), set of virtual characters or character interaction, encounters, settings, aesthetics, levels, premise or theme amongst other things. The "story" or "storyline" includes all such areas and aspects of the game that may be impacted by the location of the player. Some of these terms are explained in more detail below.

A "plot" defines the events a story comprises, particularly as they relate to one another in a pattern, a sequence, through cause and effect, or by coincidence. A well thought through plot with many different patterns of events results in a more engaging and interesting game. A plot may have a beginning, a middle, and an end, and the events of the plot may causally relate to one another as being either dependant or probable. A plot may also refer to the storyline or the way a game progresses. Similarly a storyline may refer to a plot or a subplot of a virtual world.

In a virtual world, a "plot node" may be defined as a forking point in the storyline where the plot of the story can diverge based on the decisions a player makes, or the location of the player.

"Plotline" can be considered a certain sequence of interconnected plot nodes, while a set of plot nodes may or may not be interconnected. A plotline may be integral to the main storyline or may be complimentary and thus provide extra possibilities in terms of virtual character interaction and location-specific scenarios. Thus there may be a certain association between a certain location and a plotline or a certain set of plot nodes. Therefore when a player from a certain location joins the gameplay, the plotline or set of plot nodes associated with this location may become incorporated into the gameplay.

In a virtual world, an "encounter" may be defined as a meeting between two or more virtual characters or may be thought of as a decision point at which a player encounters an opposing element (e.g. an enemy). An encounter may be player initiated (actively engaging in fighting an enemy) or unwanted by the player. A player may opt to avoid an encounter or may actively engage in them to move to the next level of the virtual world. The outcome of the encounters may at times define how the rest of the game progresses.

A "random encounter" is a feature commonly used in various role-playing games (RPGs) whereby an encounter with a non-player character (NPC), an enemy, a monster, or a dangerous situation occurs sporadically and at random. Random encounters are generally used to simulate the challenges associated with being in a hazardous environment, such as a monster-infested wilderness or dungeon usually with an uncertain frequency of occurrence to simulate a chaotic nature.

The "premise" of a game or concept statement is a short, direct description of the situation of a game and describes the fundamental concept that drives the plot. The premise determines the primary goals of the virtual characters of a virtual world, the opposition to these goals and typically may define the means and the path that these virtual characters may take in achieving those goals. The primary objective is usually sought by both the protagonist (hero) and the antagonist (villain) but may only be achieved by one of them.

A "theme" is the main idea, moral, or message, of a game. It is typically the common thread or oft repeated idea that is incorporated throughout a game. Examples of themes in games: espionage-themed role-playing game, martial arts-themed iPod based game, single-player horror-themed PC adventure game, fantasy-themed role-playing game, science fiction themed computer game, adult-themed video game, a horror-themed FPS (first person shooter) video game, futuristic-themed competitive fighting game, paranormal investigation-themed role-playing game etc.

"Settings" in the virtual world control multiple areas of the virtual world (game). Settings may be changed by a player or may be impacted by the location of a player. Examples of settings are difficulty settings, music on or off, sound effects on or off, gore on or off (e.g. for shooter or violent types of games). The difficulty setting may be changed depending on the player location.

A "level" refers to a discrete subdivision of the virtual world. Typically a players begins at the lowest level (level 1), and proceeds through increasingly numbered levels, usually of increasing difficulty, until they reach the top level to finish the game. In some games, levels may refer to specific areas of a larger virtual world, while in other games it may refer to interconnected levels, representing different locations within the virtual world.

A "statistic" (stat) is a datum which represents a particular aspect of a virtual character. Most virtual worlds separate statistics into several categories. The set of categories actually used in a game system, as well as the precise statistics within each category may vary greatly from one virtual world to another. Many virtual worlds also use derived statistics whose values depend on other statistics, which are known as primary or basic statistics. Derived statistics often represent a single capability of the character such as the weight a character can lift, or the speed at which they can move. Derived statistics are often used during combat, can be unitless numbers, or may use real-world units of measurement such as kilograms or meters per second.

A virtual character's statistics affects how it behaves in a virtual world. For example, a well-built muscular virtual character may be more powerful and be able to throw certain virtual objects farther, but at the same time may lack dexterity when maneuvering intricate virtual objects. A virtual character may have any combination of statistics, but these statistics may be limited by either a hard counter, soft counter or a combination of both.

Most devices where virtual worlds exist provide a mechanism to save the state of the game, so that the game can be played from the same point where it was left off. Methods for saving the state of the game include but are not limited to the examples cited here, for example a gaming console may provide internal memory chips, or a port where a user can connect user supplied memory; while games played over the Internet may provide online memory. The aforementioned memory space can also be used for saving the different components of the storyline that are affected by the change in the real world location of the player to enhance the gameplay experience.

FIG. 1 is a flow chart representing a first general concept of the invention. A system is provided with a virtual world 101. The virtual world may be a single player game or a multi-player game or a MMORPG (Massively Multiplayer Online Role Playing Game) and may exist on any type of a gaming device which may include but not limited to an iPhone, iPad, Smartphones, Android phones, personal computers e.g. laptops, gaming consoles like Nintendo Wii, Nintendo DS, Sony PlayStation, Microsoft Xbox 360, and online server based games etc.

The computer program comprises: a computer usable medium having computer usable program code, the computer usable program code comprises: computer usable program code for enabling change in storyline based on the real world location of a player, computer usable program code for presenting graphically to the player the different options available to modify and personalize different aspects of the virtual world including but not limited to settings.

Within the virtual world, the player engages in gameplay 102. As mentioned earlier, the term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

In the course of gameplay (or at login), player location information is gathered (e.g. using a built-in GPS sensor of the gaming device) 103. As technology advances, it is foreseen that more and more miniaturized electronic components become cost effective to be mass produced and included in all sorts of devices. Today many types of mobile devices e.g. Smartphones like iPhone include a built-in GPS sensor, have data coverage via mobile cellular network or WiFi, and are widely used for engaging in the gameplay of virtual worlds. Similarly digital maps have become readily available e.g. Google Maps, Microsoft Bing Maps, etc. and once the GPS co-ordinates have been received from the GPS sensor, the coordinates can be used for identifying the location/geographic landscape and acquiring other information e.g. demographics of the location. Digital maps may be local or may be accessed over the network e.g. over the Internet.

There may be other methods, well known in the art, to determine the player location, e.g. using the Wireless Assisted GPS (A-GPS), WiFi network, using IP address, player provided information, using billing address zip/area code, etc.

The player location information is then used to change the storyline 104. Several exemplary methods of storyline change based on player location are provided in this application.

For example, in a single player virtual world, there may be many variations of the virtual world such that each variation is associated with a profile, and certain physical real world locations (cities, specific areas within cities, landmarks etc.) may be associated with a certain profile. There may be generic profiles that are associated with areas in general, and there may be specific profiles that are associated with specific and unique real world locations. For example there may be a generic profile for a downtown, a suburb, a ghetto, a beach, a forest, a rural area, a resort, a hotel, a museum, etc. When a player's location is determined by gathering location information, it may be determined that the player is in a certain type of location (e.g. downtown) the relevant variation of the virtual world may be applied, using a generic profile. The location profile may have different Player Characters, Non-Player Characters, and settings for virtual character statistics. For example the personalities of virtual characters when playing the game in a downtown area may be more violent as opposed to when playing the same game in a suburban area or vice versa. Such an effect can be achieved by having different stats for the PCs and NPCs, such that one set of stats is associated with a certain type of area while another set of stats is associated with another type of area. Thus by having different sets of stats, each associated with a certain area, the same Player Character can exhibit a different behavior/personality depending on the player's location. Player- or non-player characters may also use different speech patterns, languages, accents or dialects.

Specific location profiles can also be used. For example, when a player engages in gameplay of a certain platform virtual world from e.g. New York, N.Y., the New York skyline may be used and the virtual characters jump from one New York sky scraper to another until they reach the Statue of Liberty. When the same game is played in Toronto, Canada, the Toronto skyline is used and the virtual characters may then be required to jump from one Toronto high-rise to another until they reach the CN Tower.

Other effects are possible in a multi-player virtual world. For example, when each player logs on to the server, a set of plot nodes associated with that player's location may now become available to the other players engaged in the gameplay of the virtual world. When another player logs off, the set of plot nodes associated with that particular location may now be unavailable to the players still playing the game. Thus the gameplay can change as players from diverse real world locations engage and disengage in the gameplay of the virtual world.

Figure 2:
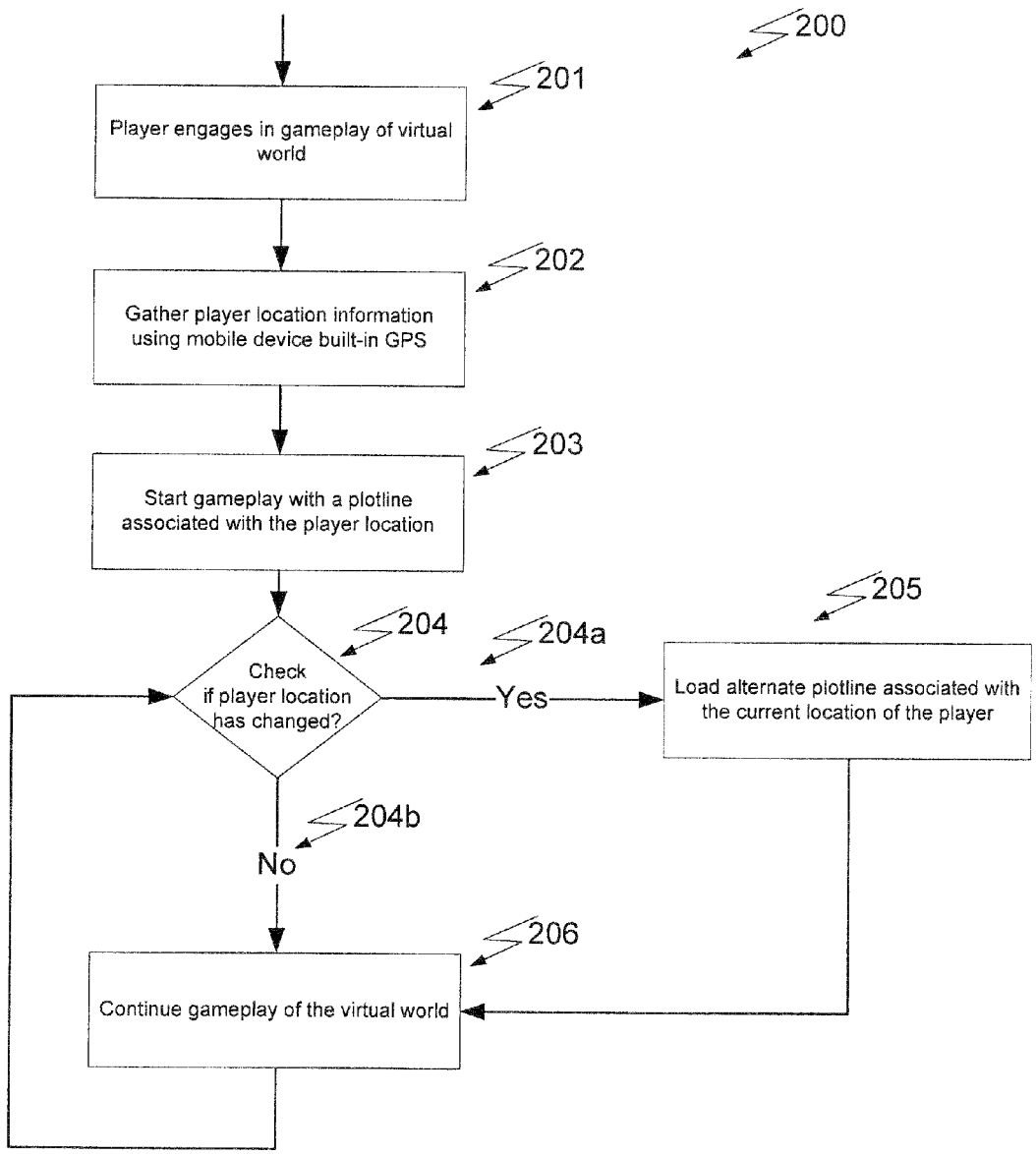
FIG. 2 is a flow diagram representing an example of ongoing geographic location detection.

FIG. 2 illustrates a method of ongoing location detection. In a virtual world with a storyline that can change based on player location, a player engages in gameplay 201. Player location information is first gathered (e.g. from the embedded GPS of the player's gaming device) 202.

Gameplay starts using a plotline associated with the gathered/detected player location 203. The system periodically checks to see if the player location has changed 204. If player location has changed 204*a*, then an alternate plotline associated with the new location of the player may be loaded 205.

If the player location has not changed 204*b*, then gameplay may continue 206. The system continues to periodically check if player location has changed 204.

Movement of the player can be reflected literally or symbolically in the game. As the player moves from one location to another, the character may be shown or otherwise represented in motion. (e.g. a bus may be shown going from one neighborhood of the city to another), and other storyline changes may occur. Decision forks may be chosen as the player arrives at a new location.

Extra points and lives may be either granted or deducted when a player arrives at certain real world locations. For example when a player engages in gameplay of a certain virtual world while the player is atop the Statue of Liberty extra points and extra lives are granted to the player. Engaging in the gameplay of the same virtual world while the player is at school may conversely result in the deduction of points and lives.

The occurrence and outcome of special bonus features, the amounts wagered on any bets, the outcomes for any intermediate game stages, the results of any player decisions made during the game, bonus plays and their outcomes, the final game outcomes etc. may also change from one location to the other. Thus as an example when a game is played in a suburb it by default grants 3 lives to the player character, while if the same game is played in the ghetto, by default 5 lives are granted to the player character. Thus in one embodiment of the invention, the system of the invention may also take into account the socioeconomic and demographic information available about a location and use this information in the decision making process. Thus for example more player character lives may be granted by default in a poorer neighborhood as compared to a more affluent neighborhood or vice versa.

In one embodiment of the invention relating to a MMORPG (Massively Multiplayer Online Role Playing Game), the location of the players engaged in the gameplay at any given time may impact the storyline by making available certain branches of the storyline and/or set(s) of plot nodes may become available when players from a certain location are either logged in or logged off.

Figure 3:
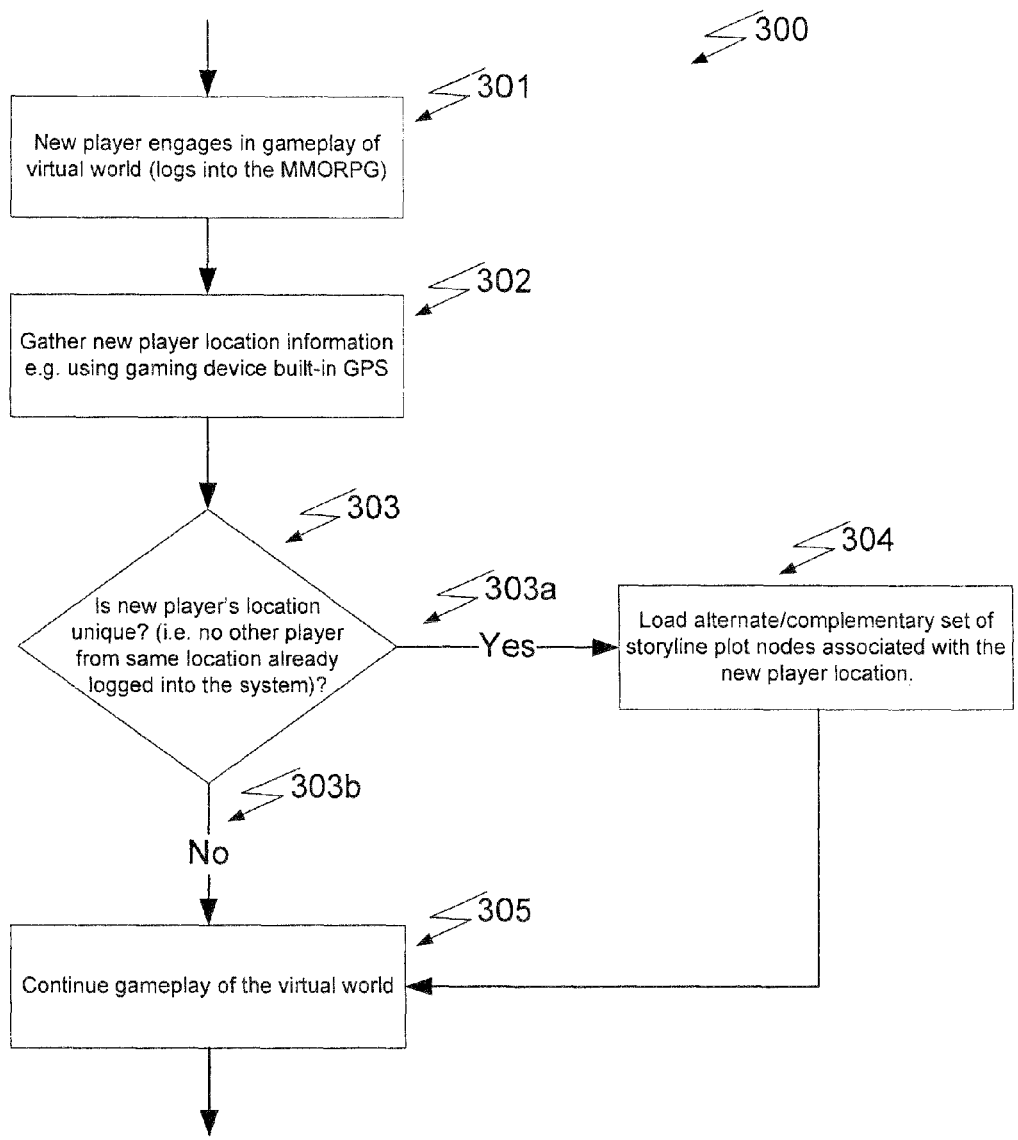
FIG. 3 is a flow diagram representing an example of how location may be used in a MMORPG context to open certain plot nodes.

FIG. 3 shows one such embodiment. As a new player engages in gameplay of the MMORPG 301, player location information is gathered/detected (e.g. using the embedded GPS sensor of a gaming device) 302. (There may be other methods for determining player location, e.g. using IP address, WiFi network location, AGPS and other well known techniques in the art.) The system checks to see if the player location is unique, i.e. if any other player from the same location is also engaged in the gameplay of the virtual world at the same time 303. If the player location is unique and no other player from that location is engaged in the gameplay 303*a* then the system may load alternate/complementary set of storyline plot nodes associated with the new player location 304, and gameplay continues 305 using the new (loaded) information.

If the player location is not unique and other players from the same location are already engaged in the gameplay of the virtual world 303*b*, then gameplay may continue 305 with no changes.

A certain set of storyline plot nodes may conversely become unavailable when a player from a certain location engages in the gameplay of the virtual world.

Figure 4:
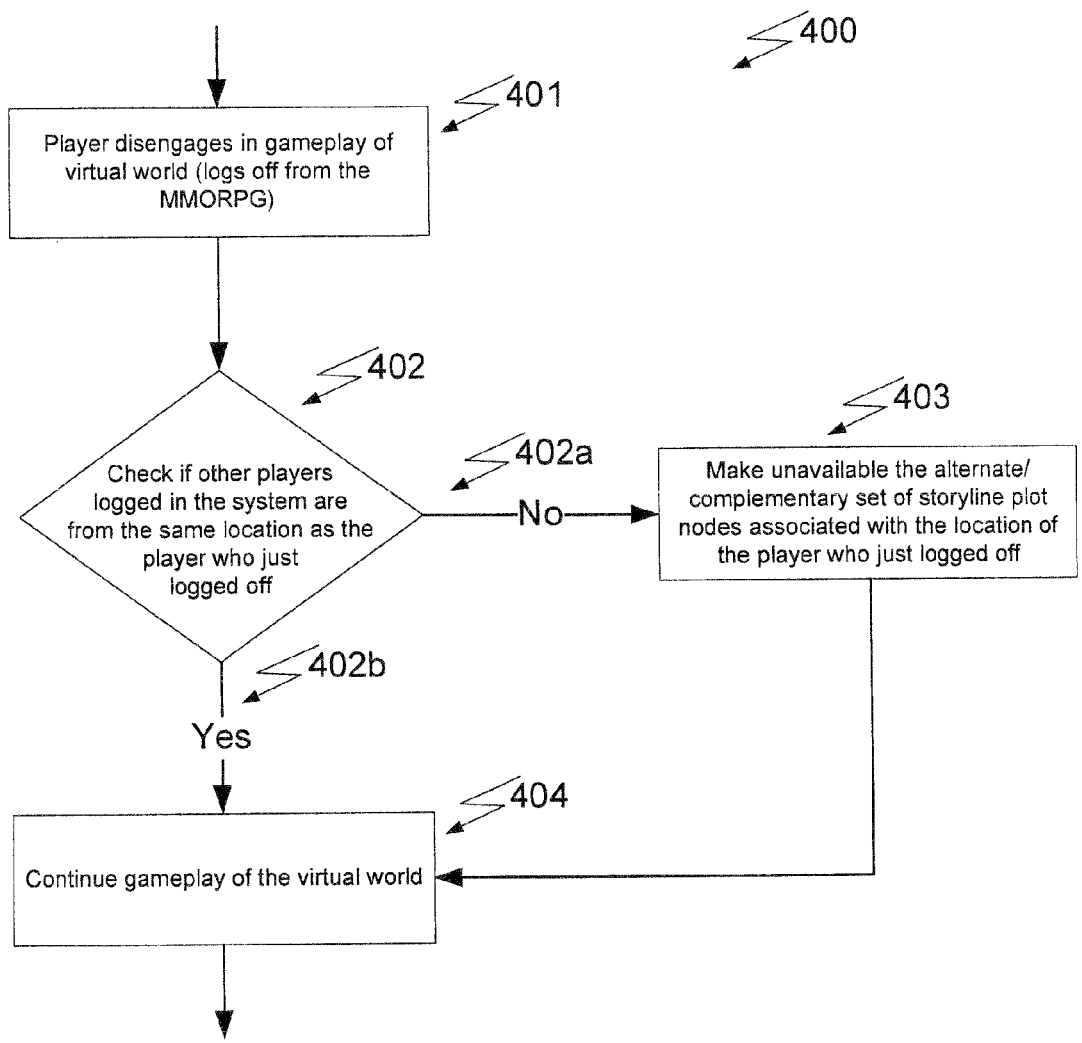
FIG. 4 is a flow diagram representing an example of how location may be used in a MMORPG context to close certain plot nodes.

FIG. 4 shows another such embodiment of the invention. When a player disengages from the gameplay of the MMORPG 401, the system may check to see if any other player from the same location is also logged in to the virtual world and engaged in the gameplay 402.

If no other player from the same location is engaged in the gameplay of the virtual world at the same time 402a, the system may make unavailable the alternate/complementary set of storyline plot nodes associated with the location of the player who just disengaged from the gameplay 403, and then the remaining players continue gameplay 404 using the (now-reduced) set of storyline plot nodes.

If other players from the same location are also engaged in the gameplay as the player who just disengaged 402b, then the system may simply allow the players to continue gameplay 403 with no changes.

Conversely, a certain set of storyline plot nodes may become available when a player from a certain location disengages in the gameplay of a virtual world.

Figure 5:
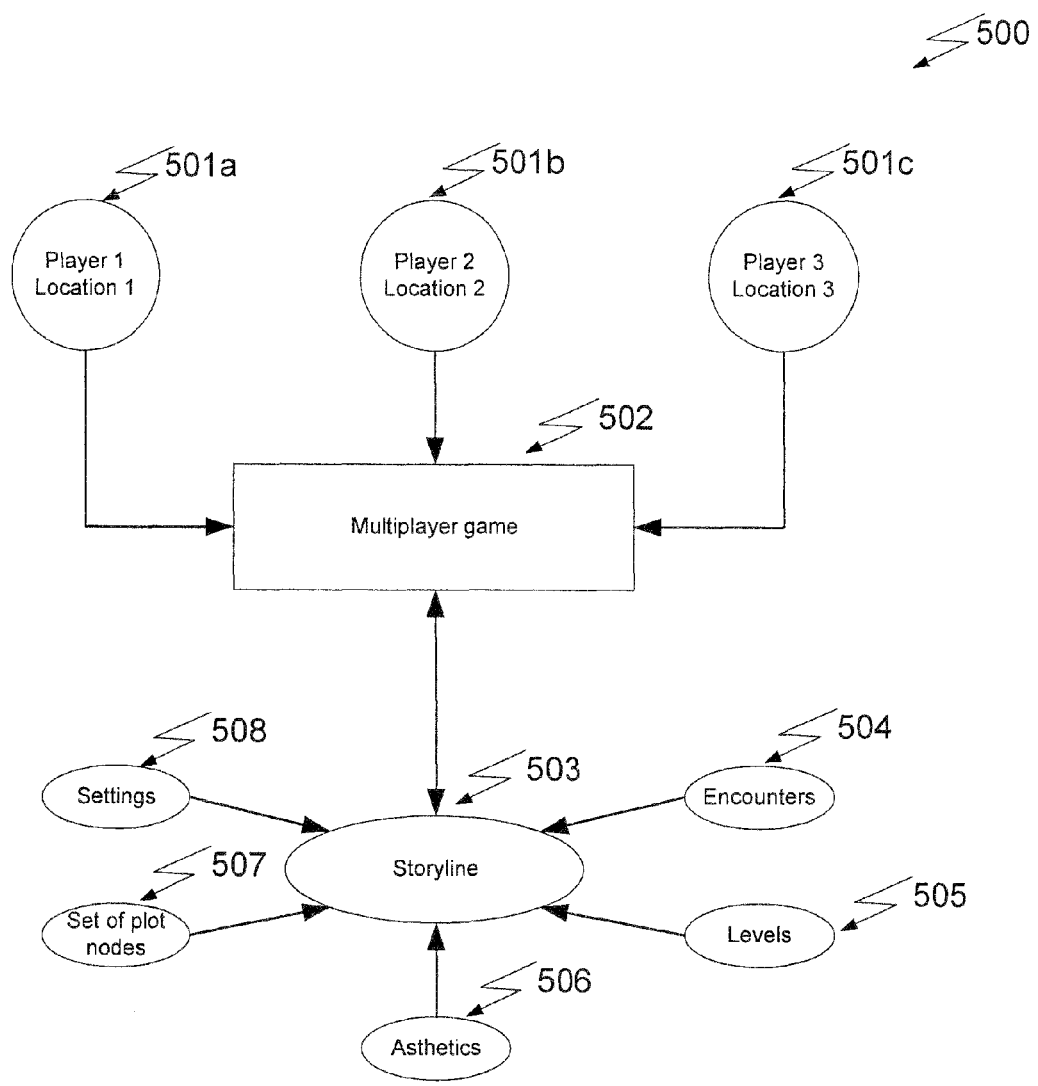
FIG. 5 is a conceptual diagram illustrating the interplay between multiple player locations and aspects of the storyline in a multiplayer game.

FIG. 5 shows a multiplayer virtual world (game) 502 where the Player1, who is located at real world location Location1 501a, Player2, who is located at real world location Location2 501b, and Player3, who is located at real world location Location3 501c, are engaged in the gameplay of the multi-player game 502. The storyline 503 of the multiplayer game 502 may be composed of encounters 504, levels, 505, aesthetics 506, sets of plot nodes 507 or settings 508 amongst other items described earlier in this application.

The storyline 503 may be impacted/changed by a change in any one of these respects based on the real world locations of the players engaged in the gameplay. The storyline 503 then in turn impacts the gameplay of the game 502.

Thus, the storyline may be changed by changing the plot nodes or set of plot nodes, virtual character (both player characters and non-player characters), set of virtual characters or virtual character interaction, settings, aesthetics, levels, premise or theme, encounters, levels etc. The application is not limited to the cited examples, but the intent is to cover all such areas that may be used in a virtual world to impact the storyline of a virtual world.

Several exemplary embodiments/implementations of the invention of a changing storyline based on player location are given below. There may be other methods obvious to the ones skilled in the art, and the intent is to cover all such scenarios.

The encounters and their outcomes may change when Player1 located at real world Location1 501a changes location. For example in the first real world location the encounter may be an underground urban fight scene while in the second real world location the same encounter is an outdoor grizzly bear fight scene. Elements of an encounter, such as opponent appearance or fighting style may tailor themselves to fit the user's real world location.

The levels aspect of the storyline may change with the change in player location, such that levels may be skipped, the character may move from one level to the other randomly, or the game may lock out odd or even number levels (or other combinations of levels) to change the storyline.

The aesthetics of the virtual world may also change with the changing real world location of the player. For example, the background of a platform game may change depending on the location (city) of the player. In New York, N.Y. the game might use a background that reflects the New York skyline, while in Tokyo, Japan it might use the Tokyo skyline.

Certain changes in the storyline may also be based on a player's preferences. A player's gaming style can be defined by player preferences, which may have been captured by either tracking the player's gaming style or by asking the player a series of questions, and then the answers from these questions determining the gaming style which in turn impacts the storyline. For example if a player does not like violent games, it is possible to create a pacifist protagonist, acting as a "voice of reason" archetype to convince violent forces in the virtual world to give up their arms and stop fighting. Alternatively, mental encounters, such as puzzles, or social encounters, such as romances, can be emphasized or substituted in lieu of combat encounters.

The virtual character interaction may change with the player location. For example in one location the virtual character interaction is more subdued while in another location the character is more aggressive and the associated dialogue may also change. Such an embodiment can be implemented by having different scripts for the virtual characters, and by changing the scripts when the real world location of the player changes.

The theme of the game may also change from location to location. For example, in one real world location the theme may be to embrace the differences in others while in another real world location the theme of the same game may be simply to fear the unknown. Two example locations might be a community center (for the former theme) and a famous haunted house (for the latter).

The premise of the game may change with the location. For example, in one real world location the premise may be to find the holy grail, while in another real world location the same game's premise may be to slay the evil wizard. Two example locations might be a garbage dump (for the former premise) or the top of the CN Tower (for the latter premise).

A script defines the default behavior of a virtual character. Just as with statistics, different scripts can refer to different behaviors. A default script of a virtual character may define its default behavior and in order to implement an altered behavior associated with a change in location a certain other script may be used instead of the default script of a virtual character.

For example, the scripts that may be associated with a certain location can be already embedded in a virtual world (game), but are dormant. These may be invoked once a player is at a particular location. Generic scripts may be associated with generic locations, e.g. downtown, suburb, beach, mall, rural area, lake, other such natural or man-made geographic locations etc. based on the real world location of the player. If the player is on a beach, a certain set of scripts may be used, and if the player is in a remote conservation area a certain other set of scripts may be used.

The location of the player can be used to define the Player Character(s), some or all Non-Player Characters, and certain sets of plot nodes, levels, or encounters. Thus when a player engages in gameplay from a certain location, the Player Character (PC) may have certain characteristics that are based on the location of the player. The system of invention may also load a certain type of NPCs, (the number of NPCs itself may also vary with the player location) and a certain set of plot nodes associated with the player location. As more players from more diverse locations join the game the storyline of the game keeps changing as more varied PCs, NPCs and encounter are introduced into the game.

When a player engages in gameplay from a new location, the system of the invention may import scripts associated with this location, so that the resulting gameplay is varied and thus more sophisticated.

The scripts associated with different locations may be downloaded (either automatically or by player request) from a central server that acts as a repository for additional scripts. The user may have to pay when acquiring these additional scripts e.g. from a remote server.

The storyline of the virtual world may have multiple endings, and a player's real world location determines the ending chosen.

The storyline of the virtual world may have multiple forks with multiple possibilities, and each time the player location changes, a new path(s) may be chosen either randomly or based on a dice roll or based on a pre-configured setting or based on a player defined setting.

The statistics of the player character (PC) and the non-player characters (NPC) may depend on a player location and may change when the player location changes. For example in one embodiment when a player engages in gameplay of a particular virtual world from a first location the stats for a PC are such that the virtual character is physically very strong but is less intelligent, while when the same player engages in the gameplay of the same virtual world from a second location, the stats for the same PC are such that the virtual character is now more intelligent but less strong physically. The change in virtual character statistics may either depend on predefined relationships or may depend on a dice roll or may be entirely random.

A framework or an API (Application Programming Interface) may be provided for virtual world creation that allows a developer to incorporate the functionality of a changing storyline based on player location. Using such a framework or API allows for a more uniform virtual world generation, and eventually allows for more complex and extensive ability to change storyline when a player location changes.

It should be understood that although the term game has been used as an example in this application but in essence the term may also imply any other piece of software code where the embodiments of the invention are incorporated. The software application can be implemented in a standalone configuration or in combination with other software programs and is not limited to any particular operating system or programming paradigm described here. For the sake of simplicity, game applications are used as examples. Similarly, users of these applications are described herein as players. There is no intent to limit the disclosure to game applications or player applications. The terms players and users are considered synonymous and imply the same meaning. Likewise, virtual worlds, games and applications imply the same meaning. Thus, this application intends to cover all applications and user interactions described above and ones obvious to persons skilled in the art.

Although virtual world storyline changes based on player location have been exemplified above with reference to gaming, it should be noted that virtual worlds are also associated with many industries and applications. For example, virtual worlds can be used in movies, cartoons, computer simulations, and video simulations, among others. All of these industries and applications would benefit from a changing storyline based on player location.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to persons skilled in the art.

What is claimed is:

1. A method of enabling virtual gameplay on a computing device in communication with a storage medium, the method comprising the steps of:
   providing a video game environment on the computing device, enabling a first player to play a game via a character, the first player being one of a plurality of players which have access to the video game environment, each player having a geographic location;
   detecting, via an input device in communication with the computing device, the first player's geographic location, and storing the player's geographic location on the storage medium; and
   in response to the detected geographic location, retrieving, via the computing device, a storyline for the first player's character to interact with, the retrieved storyline being related to the geographic location of the first player; and permitting the other players' characters to interact with the retrieved storyline as long as the first player remains connected to the game;
   wherein other storylines are opened and closed to the first player's character as other players enter and leave the game.

2. The method of claim 1, further comprising detecting a second or subsequent geographic location of the first player in the course of gameplay, and retrieving a second or further storyline for the first player's character to interact with, the second or further storyline being related to the second or subsequent geographic location.

3. The method of claim 2, wherein the second or further storyline replaces the previously retrieved storyline.

4. The method of claim 2, wherein the second or further storyline is added to the previously retrieved storyline.

5. The method of claim 1, wherein each storyline comprises one or a combination of plot, plot nodes, character interactions, encounters, settings, aesthetics, levels, premise, or theme.

6. The method of claim 1, wherein the storyline includes graphical images of a generic background scene related to the geographic location.

7. The method of claim 6, wherein the generic background scene is selected from the group consisting of downtown, mall, suburbia, ghetto, countryside, farm, beach, lake, forest, desert, mountainside, airport, and train station.

8. The method of claim 1, wherein the storyline includes graphical images of a location-specific background scene, including at least one landmark representative of the player's detected geographic location.

9. The method of claim 1, further comprising correlating the detected geographic location to demographic data for that geographic location, and triggering non-player characters to enter the game that represent the demographic data.

10. The method of claim 1, further comprising correlating the detected geographic location to population density data for that geographic location, and triggering non-player characters to enter the game that represent the population density data.

11. The method of claim 1, further comprising modifying character statistics of the first player's character in response to the detected geographic location.

12. The method of claim 1, further comprising modifying tools, equipment or clothing of the first player's character in response to the detected geographic location.

13. The method of claim 1, wherein players co-located in one geographic location can interact in the game with each other via their characters.

14. The method of claim 1, wherein a new player joining the game from a previously-unrepresented geographic location opens up a new storyline for all of the players currently in the game.

15. The method of claim 1, wherein if a player is the only player from a specific geographic location, the departure of that player from the game closes up a storyline for the remaining players in the game.

16. The method of claim 1, wherein the first player's geographic location is re-detected at intervals, and in the event of a change in the first player's geographic location, the first player's character is shown moving to a new scene in the storyline.

17. The method of claim 1, wherein the detecting step includes retrieving location data from one or a combination of GPS, A-GPS, WiFi, IP address, account or billing address, and player provided location information.

18. The method of claim 1, wherein the detecting step further includes retrieving at least one map from a map database in response to the at least one detected geographic location.

19. The method of claim 1, wherein the geographic location is detected at login.

20. The method of claim 1, wherein the geographic location is detected during gameplay.

21. The method of claim 1, wherein if no geographic location is detected or the detected geographic location is an unsupported geographic location, a default storyline is provided.

22. The method of claim 1, wherein the storage medium is provided by one or a combination of: a local fixed memory, a local removable memory, a remote fixed memory, a remote removable memory, and a virtual memory.

23. The method of claim 1, wherein the storage medium is selected from the group consisting of: a local data storage of a game console, a local inbuilt memory, a user provided memory, an online server, and a shared folder on a network.

24. The method of claim 1, wherein the first player is enabled to play the game using a game device, and the player's geographic location is detected by an on-board sensor on the game device.

25. The method of claim 24, wherein the game device is a mobile device.

* * * * *